United States Patent
Hunt

[11] 3,757,753
[45] Sept. 11, 1973

[54] FUEL TANKS

[75] Inventor: Allan Frederick Hunt, Solihull, England

[73] Assignee: Chrysler United Kingdom Limited, London, England

[22] Filed: Oct. 5, 1971

[21] Appl. No.: 186,633

[30] Foreign Application Priority Data
Oct. 16, 1970 Great Britain.................. 49,336/70

[52] U.S. Cl.................................. 123/136, 220/85
[51] Int. Cl............................................ F02m 25/08
[58] Field of Search................ 123/136; 220/85 VR, 220/85 VS

[56] References Cited
UNITED STATES PATENTS

| | | |
|---|---|---|
| 3,191,587 | 6/1965 | Hall .................................. 123/136 |
| 3,675,634 | 7/1972 | Tatsutomi........................... 123/136 |
| 2,860,656 | 11/1958 | Eshbaugh........................... 123/136 |
| 3,698,160 | 10/1972 | Hunter............................... 123/136 |
| 3,542,239 | 11/1970 | Latvala.............................. 123/136 |
| 3,554,175 | 1/1971 | Sarto................................. 123/136 |
| 3,221,724 | 12/1965 | Wentworth......................... 123/136 |

Primary Examiner—Laurence M. Goodridge
Assistant Examiner—Cort Flint
Attorney—John A. Mawhinney

[57] ABSTRACT

A fuel tank for a motor vehicle engine has a vent pipe for fuel or vapour overflow leading from an upper end of the tank filler pipe to a liquid separator chamber housed within the tank. The vent pipe extends from the separator chamber to a container holding activated carbon particles for adsorbing fuel vapour and thence to an air cleanser for the engine carburettor.

7 Claims, 1 Drawing Figure

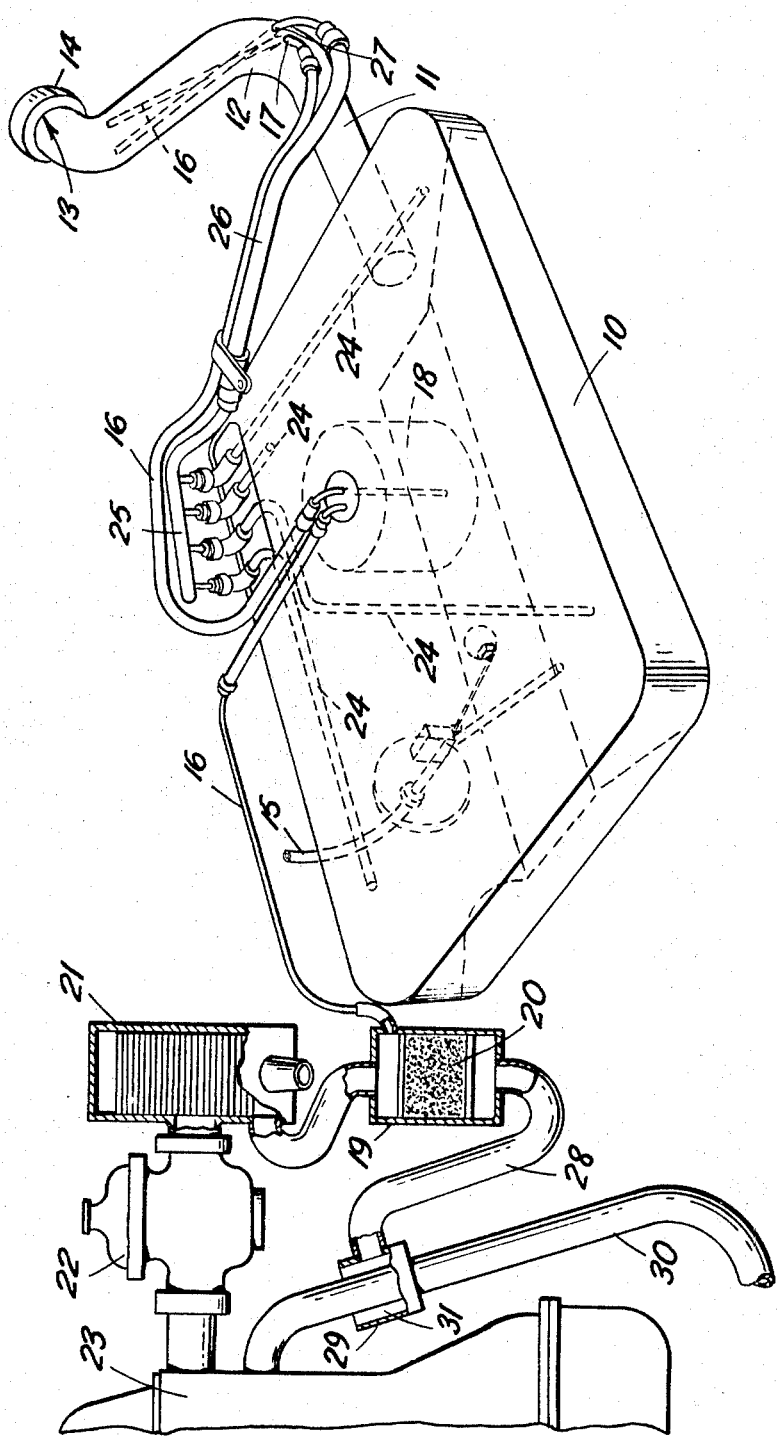

FUEL TANKS

This invention relates to fuel tanks for motor vehicle engines.

The invention provides a fuel tank for a motor vehicle engine having a filler pipe extending upwardly of the tank, a cap for sealing the filler pipe, an outlet pipe connected to the tank for delivery of fuel from the tank a vent pipe which opens into the filler pipe above the tank for venting air into the tank and receiving excess liquid and/or vaporised fuel, a device located in the vent pipe for collecting fuel vapour passing along the vent pipe from the filler pipe and a liquid separator located in the vent pipe between the filler pipe and said device for collecting liquid fuel passing along the vent pipe from the filler pipe which separator is housed within the fuel tank.

Preferably the liquid separator comprises a separate chamber in the fuel tank, the vent pipe from the filler pipe opens into the bottom of the chamber and the vent pipe to the vapour collection device leads from the top of the chamber so that any liquid collected in the chamber syphons back to the filler pipe when fuel is removed from the tank.

It is also preferred that the vent pipe is connected to the air inlet side of a carburettor for the vehicle engine.

In any of the above arrangements the device for collecting fuel vapour may include means for adsorbing the vapour.

In the latter arrangement means may be provided for supplying heated air to the vapour collection device to revaporise the fuel and pass the vaporised fuel to the air inlet of the carburettor.

The means for heating the air may comprise a heating jacket encircling a part of an exhaust system for the engine which jacket has an opening for receiving air and is connected to said device for removing fuel vapour so that air is drawn through the jacket past said device to the carburettor inlet when the engine is running and the heated air removes the fuel from said adsorption means.

In any of the above arrangements a plurality of conduits may lead from the top of the tank to the upper end of the filler pipe to deliver vapour from the tank to the filler pipe. Said plurality of pipes may be connected to a manifold and a single pipe may lead from the manifold to the upper end of the filler pipe.

The following is a description of a specific embodiment of the invention reference being made to the accompanying drawing which is a diagrammatic view of a vehicle fuel tank and associated system.

Referring to the drawing, a fuel tank for a motor vehicle is indicated at 10. The tank has a filler pipe 11 extending from one side thereof which is turned upwardly at an elbow 12 and leads to an open neck 13 located above the top of the tank. The neck 13 is sealed by a filler cap 14. Fuel is drawn from the tank and supplied to the engine carburettor through a conduit 15.

Air is vented into the tank by a vent pipe 16 which leads into the filler pipe 11 through a fluid tight joint at the elbow 12 through an opening 17. The vent pipe extends up the filler pipe and terminates adjacent the neck 13. A closed liquid separator chamber 18 is housed within the tank 10 and is secured to the underside of the top wall of the tank. The vent pipe leads through the top wall of the tank into the chamber 18 and stops just short of the bottom of the chamber.

A continuation of the vent pipe leads from the upper part of the chamber out through the top wall of the tank through a container 19 filled with activated carbon granules 20 for adsorbing fuel vapour and thence to an air cleaner 21 for a carburettor 22 of the vehicle engine 23 through which air passes before entering the carburettor.

If the temperature of the fuel rises causing vaporisation of the fuel when the vehicle engine is not running, the fuel vapour can pass through the vent pipe 16 and the chamber 18 to the container 19 where it is adsorbed by the activated carbon. If the tank is full or nearly full and the temperature of the fuel rises, the fuel may expand until the fuel level rises above the open end of the vent pipe 16 in the filler pipe 11. The liquid fuel will then pass down the vent pipe and will be collected in the chamber 18. When fuel is withdrawn from the tank through the conduit 15 air vents into the tank through the vent pipe 16 because the depression caused above the fuel in the tank is greater than the air depression in the air cleaner. Any liquid fuel collected in the chamber 18 will then syphon back to the filler pipe and thence drain down to the tank.

To avoid trapping of pockets of vapour in the tank four conduits 24 lead from the top of the tank adjacent the four corners thereof to a manifold 25 when the conduits are collected into a single conduit 26 which leads through or has a fluid tight seal in a hole 27 in the elbow 12 of the filler pipe and thence up the filler pipe to stop just short of the open end of the vent pipe 16. Thus any vapour collecting in the tank can pass into the filler pipe.

The container 19 for the activated carbon is connected by a pipe 28 to a heating jacket 29 which encircles a branch 30 of an exhaust system for the vehicle engine. The jacket 29 has an opening 31 for receiving air so that when the engine is running the resulting air depression in the air cleaner draws air into the heating jacket 29 where it is heated and thence to the container 19. The hot air passing through the carbon granules causes the adsorbed fuel to re-vaporise and the fuel vapour passes to the air cleaner and thence into the engine carburettor. Thus the fuel vapour does not escape to atmosphere.

It will be appreciated that many modifications may be made to the above embodiment without departing from the scope of the invention. For example the ambient temperature of the engine compartment may be sufficiently high to re-vaporise condensed fuel vapour from the activated carbon particles 20 in the container 19 in which case the heater jacket 29 and pipe 28 can be dispensed with. The container 19 is provided with an inlet for air from the engine compartment.

I claim:
1. A fuel tank for a motor vehicle engine having a filler pipe extending upwardly of the tank, a cap for sealing the filler pipe, an outlet pipe connected to the tank for delivery of fuel from the tank, a vent pipe which opens into the filler pipe above the tank for venting air into the tank and receiving excess liquid and/or vaporized fuel, a device located in the vent pipe for collecting fuel vapour passing along the vent pipe from the filler pipe and a liquid separator located in the vent pipe between the filler pipe and said device for collecting liquid fuel passing along the vent pipe from the filler pipe which separator is housed within the fuel tank, said liquid separator comprising a separate chamber in the fuel tank and the vent pipe from the filler pipe opens into the bottom of the chamber and the vent pipe to the vapour collecting device leads from the top of the chamber so that any liquid collected in the chamber syphons back to the filler pipe when fuel is removed from the tank.

2. A fuel tank as claimed in claim 1 wherein the vent pipe is connected to the air inlet side of a carburettor for the vehicle engine.

3. A fuel tank as claimed in claim 1 wherein the device for collecting fuel vapour includes means for adsorbing the vapour.

4. A fuel tank as claimed in claim 3 wherein means are provided for supplying heated air to the vapour collection device to revaporise the fuel and pass the vaporised fuel to the air inlet of the carburettor.

5. A fuel tank as claimed in claim 4 wherein the means for heating the air comprise a heating jacket encircling a part of an exhaust system for the engine which jacket has an opening for receiving air and is connected to said device for removing fuel vapour so that air is drawn through the jacket past said device to the carburettor inlet when the engine is running and the heated air removes the fuel from said adsorption means.

6. A fuel tank as claimed in claim 1 wherein a plurality of conduits lead from the top of the tank to the upper end of the filler pipe to deliver vapour from the tank to the filler pipe.

7. A fuel tank as claimed in claim 6 wherein said plurality of pipes are connected to a manifold and a single pipe leads from the manifold to the upper end of the filler pipe.

* * * * *